Aug. 13, 1968
AKIRA IIJIMA
3,397,282
LIGHT SPOT FOCUSSING DEVICE USED FOR FACSIMILE TRANSMITTING EQUIPMENT
Filed May 14, 1965
3 Sheets-Sheet 1
FIG 1
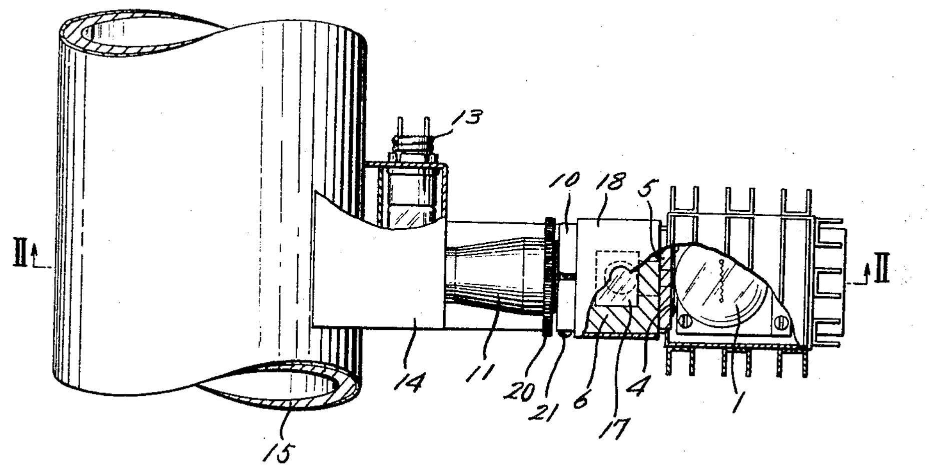
FIG 2
FIG 2, FIG 7
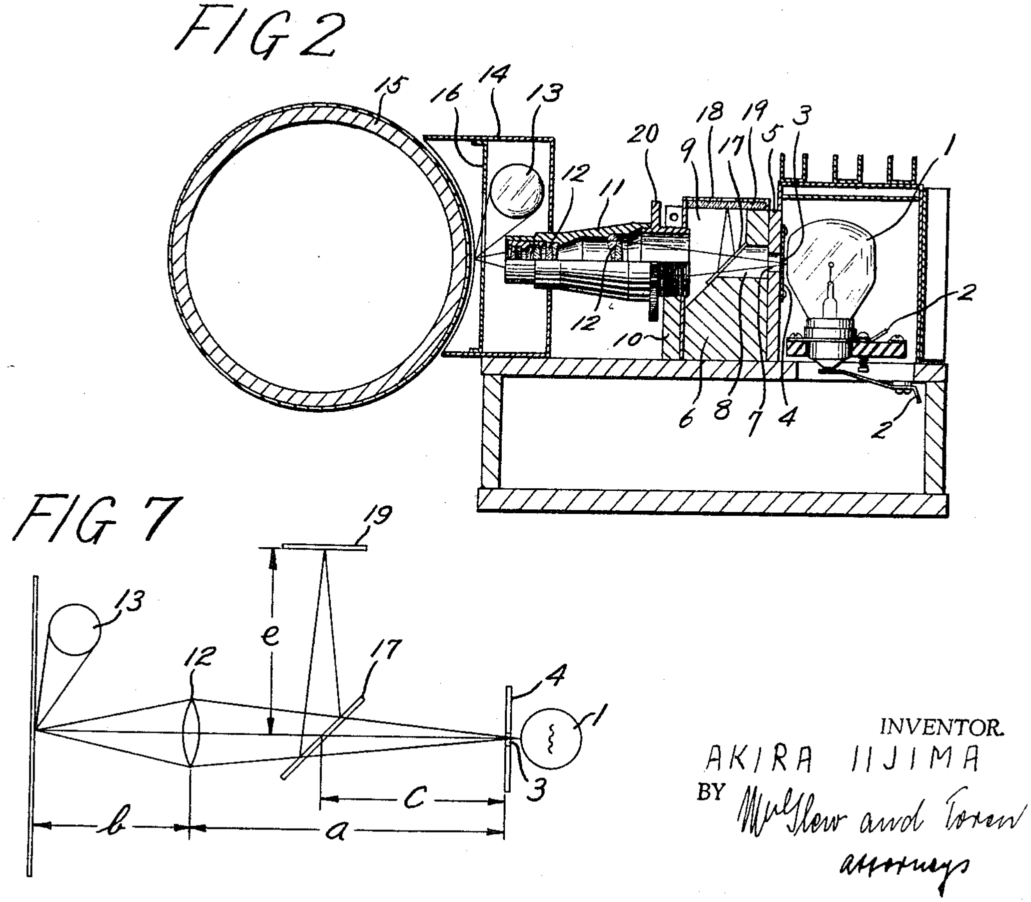
INVENTOR.
AKIRA IIJIMA
BY McGlew and Toren
attorneys Aug. 13, 1968

AKIRA IIJIMA 3,397,282

LIGHT SPOT FOCUSSING DEVICE USED FOR
FACSIMILE TRANSMITTING EQUIPMENT

Filed May 14, 1965

3 Sheets-Sheet 2

INVENTOR.
AKIRA IIJIMA
BY McGlew and Toren
Attorneys

INVENTOR.
AKIRA IIJIMA
BY McGlew and Toren
attorneys

United States Patent Office 3,397,282
Patented Aug. 13, 1968

3,397,282
LIGHT SPOT FOCUSSING DEVICE USED FOR FACSIMILE TRANSMITTING EQUIPMENT

Akira Iijima, Yokohama, Japan, assignor to Denki Onkyo Co., Ltd., Tokyo, Japan

Filed May 14, 1965, Ser. No. 455,900
Claims priority, application Japan, Oct. 15, 1964, 39/80,609
4 Claims. (Cl. 178—6)

ABSTRACT OF THE DISCLOSURE

A light spot focussing device, particularly useful with facsimile transmitting equipment, is disclosed as including means for reflecting the light spot, focussed on copy on a facsimile cylinder, to a monitoring screen where the sharpness of focussing may be readily observed. By observing the reflected light spot on the monitoring screen, an operator can adjust the focus of the light spot directed on the copy on the facsimile cylinder.

*Background of the invention*

This invention relates to a light spot focussing device used for a facsimile transmitting equipment.

In a facsimile equipment, the surface of a photograph, picture or writing is scanned with light spot, and the reflected light of the scanning light spot is converted into electrical signals by means of a photoelectric conversion element, such as a photoelectric cell. Then the electrical signal is transmitted to a receiver. If, therefore, the light spot mentioned above is not focused on the surface of the photograph or the like in question, the picture obtained by telephotography will be lacking in sharpness.

However, as the light spot is formed by projecting a beam from the light source through a narrow aperture and focussing the projected beam by means of a lens, it is impossible to discern whether or not the light spot has been focused. With a conventional light spot focussing device of a similar kind, therefore, it was not possible to detect deterioration of the sharpness of focussing of the scanning light spot arising from changes in the thickness of the illuminated material and to adjust the light spot focussing.

It is accordingly the object of this invention to provide a light spot focussing device which permits control of the focussing state of the light spot during scanning and which allows optimum adjustment of the light spot when any drift occurs in the focussing of such light spot.

According to the present invention, the scanning light spot appears as a magnified spot on the screen of the light spot monitoring receiver screen. When the scanning light spot is properly focused on the object to be spotlighted, the light spot on the receiver screen is clear, but when the scanning light spot is not properly focused, the light spot on the receiver screen is not clear. When the light spot on the receiver screen is not clear, the light spot can be adjusted by shifting the focussing lens back and forth or by extending or shortening the distance between the aperture and the focussing lens.

A number of other advantages and objectives of this invention are apparent in the three most preferred embodiments presented in the attached drawings.

FIG. 1 represents a plane diagram of the light spot focussing device relative to this invention, with a portion thereof omitted;

FIG. 2 is a longitudinal cross-section of the device shown in FIG. 1, taken along line II—II;

FIG. 7 is a descriptive diagram of the principle of the light spot monitoring mechanism of this invention.

Figure 3:
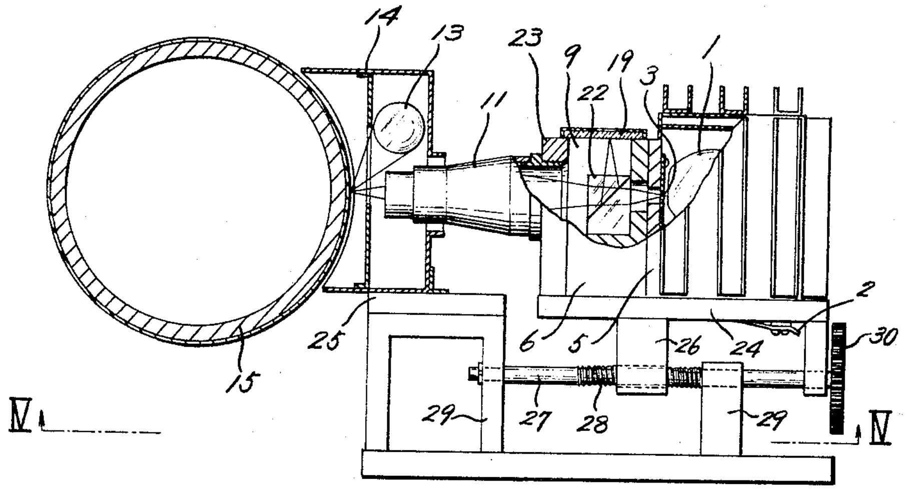
FIG. 3 is a longitudinal cross-section profile of the essential part of the second embodiment of this invention.

As shown in the above drawings, the light spot focussing device relative to this invention comprises a light source for projecting light beam, a light focussing unit composed of a group of lenses for focussing the projected light flux on the object as a scanning light spot, a light spot monitoring mechanism for observing the state of the scanning light spot on the beamed object on the receiver screen and a mechanism for adjusting the focus of the light flux by shifting the lenses and components of the focussing device cited above.

To describe the condenser unit of the first embodiment shown in FIGS. 1 and 2, the light source 1 is connected to a power source by means of terminals 2, 2, and its front panel is shielded with a plate 4 which is formed with a very narrow aperture 3. The shielding plate 4 extends vertically along the wall 5 opposite the lamp and is fixed on the wall with screws. The other side of the upright wall is in contact with the back side of the base mounting the light spot monitoring mechanism and is fixed on this side with screws. On the upright wall 5 and the base 6, through holes 7, 8 larger than the aperture 3 are provided where the aperture should be, and the through hole 8 of the base 6 is larger than the through hole 7 of the upright wall 5. Base 6 is formed with a channel-shaped notch 9 opening through its upper and forward surfaces and intersecting the hole or passage 8. Notch 9 has a base which is inclined at 45° to the horizontal and the vertical. A split wall 10 engages the front face of base 6, the split in wall 10 opening through its upper edge. Wall 10 is formed with a threaded aperture substantially larger in diameter than the opening 8 in base 6, and this threaded aperture is substantially co-axial with the opening 8. The threaded end of cylinder 11 is engaged in the threaded hole in wall 10, and this cylinder has a tapered tip. The condenser lens group 12 is housed in the cylinder and the condensed light flux is projected from the the tapered tip of the cylinder.

The tip of the cylinder is inserted into a box 14 housing a photoelectric cell 13, and the photoelectric cell is connected to an amplifier not shown in the figures. On the side of the box opposing the tip of the cylinder 11, a rotary drum 15 for mounting the object to be illuminated, such as photographs, is mounted horizontally in such a way that a portion of the drum interfits with box 14. Between the rotary drum surface and the tip of cylinder 11, a shielding plate 16 is positioned. Plate 16 is formed with an aperture for the projection and reflection of the condensed light beam used to generate electrical signals corresponding to the shading of the picture or writing. This is done by the reflected beam of condensed light flux acting directly on photoelectric cell 13. Photoelectric cell 13 may be substituted by other photoelectric conversion elements, such as photo-transistors.

The light spot monitoring mechanism of this embodiment is composed of a transparent reflector plate 17, which inclines 45 degrees and which is mounted on the inclined base of slot 9 in such a way as to shield the through hole 8, and the receiving screen, which is made of a screen and focussing glass and which is fixed on the upper surface of the base 6 with a holding plate 18 in a lid-like form. The position of the receiving screen 19 is fixed so that the distance from the transparent reflector plate to the receiving screen and the distance from the transparent reflector plate to the aperture of the light source shielding plate are equal. As long as the transparent reflector plate does not obstruct the projected light beam, a material of low-transparency, such as a half-mirror, may be used.

In this embodiment, a mechanism for shifting the condenser lenses back and forth is provided as a means of focus adjustment. As the end of the cylinder 11 housing the condenser lenses is screwed into screw thread in the split wall 10, the cylinder can be shifted back and forth by turning the dial knob 20 which is fixed on the cylinder. In order to secure the position of the cylinder, a tightening screw 21 is additionally provided for tightening the split wall.

In focussing the scanning light spot using this light spot focussing device, first the light source lamp 1 is switched on and a beam of light flux is projected through the aperture 3. The light flux passes through the diverging hole 7 in the upright wall 5 and the diverging hole 8 in the base 6 and enters the cylinder through the larger open end of the cylinder 11. It is then condensed by means of condenser lens groups 12—12 and is projected from the tip as condensed light flux to form a light spot on the object to be illuminated, such as a photograph, which is closely mounted on the face of the rotary drum 15. As the rotary drum is driven by means of a drive mechanism not shown in the figure and shifts in a horizontal direction while revolving at a specified speed, the light spot on the object spotlighted scans the object in a spiral form.

The reflection of the scanning light spot appears on the receiver screen 19 in a magnified condition. If the scanning light spot has not been formed by proper focussing, the light spot appearing on the receiving screen 19 will be lacking in clarity. In such a case, the cylinder 11 is rotated to shift the position of the condenser lenses till the light spot on the receiving screen 19 becomes clear and sharp. The fact that the light spot that appears on the receiving screen is of identical nature with the scanning light spot can be proved through the later description of FIG. 7.

Figure 4:
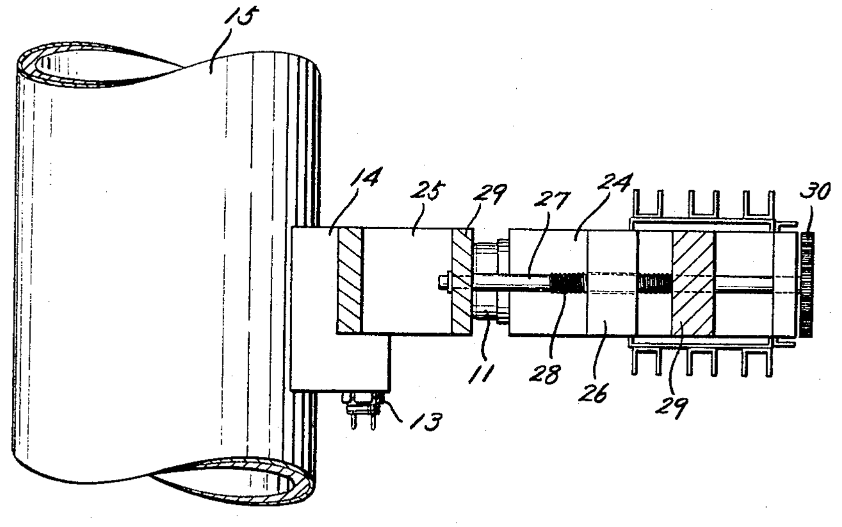
FIG. 4 is a transverse sectional view of the base of the device presented in FIG. 3, taken along line IV—IV.

The second embodiment of this invention is as presented in FIGS. 3 and 4. As in the case of the first embodiment described above, the light condensing device of this embodiment is constructed in such a way that the light from the lamp 1 is projected through the aperture 3 on the shielding plate 4 and is condensed in the cylinder 11 by means of condenser lens groups 12—12. Then the condensed light flux is projected through the tip of the cylinder to form a scanning light spot on the object to be spotlighted.

However, since the means of focus adjustment and the composition of the light spot monitoring mechanism of this embodiment differ from those of the first embodiment, the base for mounting the light spot monitoring mechanism and the cylinder for housing the condenser lenses has a different construction.

The light spot monitoring mechanism of this embodiment is constructed in such a way that the channel-shaped notch 9 of the base 6 is formed with horizontal or level bottom, and prisms 22, with inclined planes in close contact with each other, are provided so that no light will stray into the notch. The inclined plane of the prism faces extends at a 45° angle and faces the receiving screen 19, which latter is fixed with a holding plate on the upper part of the base. The inclined plane is positioned so that the spacing between the inclined plane and the receiving screen and the spacing between the inclined plane and the aperture are accurately equal. A plate 23 with a through hole is fixed on the front surface of the base, and the end of the cylinder 11 is stud-fixed in the through hole so that the light flux projected through the aperture will be beamed into the cylinder. It will be well if the distance between the prism 22 and the aperture and the distance between the prism and the receiving screen are optically equal. This is because the index of refraction of the prism can be varied by means of a medium. In this embodiment, a mechanism is provided for moving the focussing device, comprising a light source 1, base 16 and condenser lens, as a single unit for the purpose of adjusting the focus. The cylinder housing the condenser lens is fixed on the base 6, while the base 6 and the light source lamp 1 are fixed on a movable base deck 24. The base deck is divided into an immobile deck 25, on the top surface of which is fixed a box 14 containing photoelectric conversion element 13, and the movable deck 24, on the top surface of which is fixed the condenser device 111. From the bottom of the movable deck protrudes a block 26 with through screw thread, which is screwed on to screw 28 of the rotary shaft 27. The rotary shaft is supported with stanchions 29 in such a way that it cannot move back and forth, and it is rotatable by the handle 30 on the end, thus moving the movable base deck 24 back and forth during its rotation.

In this light spot focussing device, when the light spot that appears on the receiving screen is not clear, moving the movable base deck back and forth so that the light spot becomes clear gives a focused scanning light spot.

Figure 5:
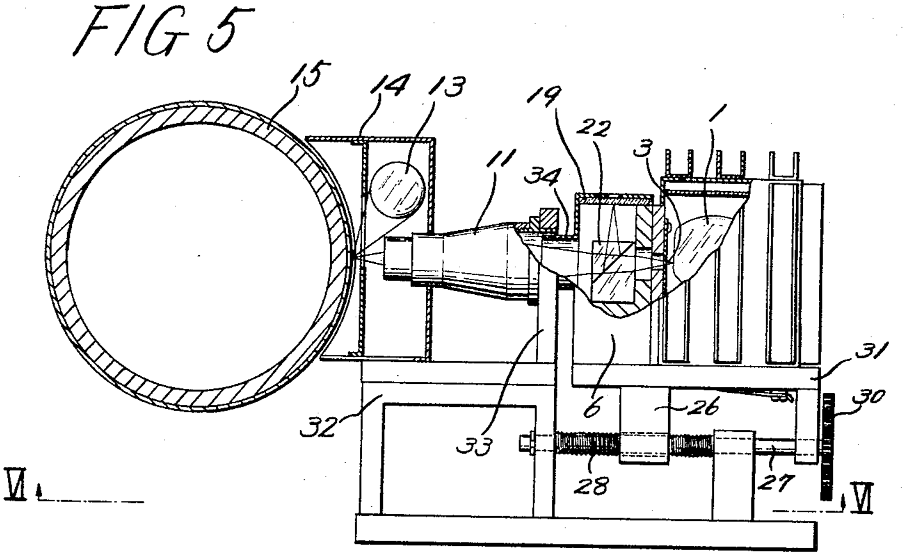
FIG. 5 is a longitudinal cross-section profile of the essential parts of the third embodiment of the present invention.
Figure 6:
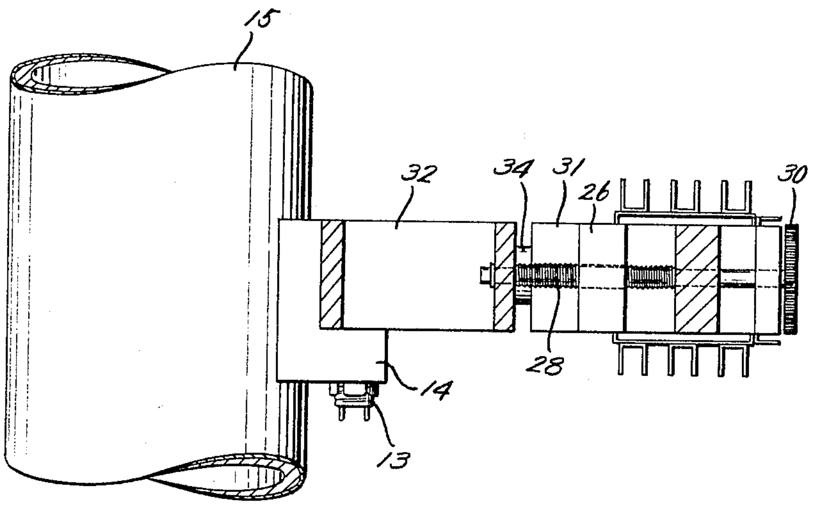
FIG. 6 is a transverse sectional view of the base of the device shown in FIG. 5, taken along line VI—VI.

The third embodiment of this invention is shown in FIGS. 5 and 6. The light condenser unit of this embodiment is identical with those presented in the first and the second embodiment cited above.

The light spot monitoring mechanism of this embodiment is identical with that shown in the second embodiment.

As the means of adjusting the focal point in this embodiment, a mechanism in which the light source 1 and the base 6 are shifted by means of a movable base deck 31 is provided.

The base deck is divided into the immobile deck 32 and the movable deck 31. On the immobile base deck, a box 14 containing the photoelectric conversion element 13 and an upright wall 33 supporting the cylinder 11 housing the condenser lens are fixed, while on the movable base deck the light source lamp and the light spot monitoring mechanism are fixed. The device for moving the movable base deck is the same as in the second embodiment.

When the movable base deck moves backward, the base and the cylinder are separated. For this reason, an inner cylinder 34 to be inserted into the cylinder is mounted on the front panel of the base.

With this light spot focussing device, when the light spot appearing on the receiver screen is not clear, a properly focused scanning light spot can be obtained by moving the movable base deck back and forth till the light spot becomes clear.

The light spot monitoring mechanism relative to this invention is explained according to FIG. 7.

The light from the light source lamp is projected through the aperture, condensed by means of light condensing lenses and is made to form a light spot on the object to be spotlighted. Supposing *a* represents the space between the aperture and the lens and *b* represents the space between the lens and the spotlighted object and *f* represents the focal range, the aperture in this case represents the position of the spot light source, forming $$\frac{1}{a}+\frac{1}{b}=\frac{1}{f}$$

relationship among them. Therefore, when the focal range *f* is determined, the aperture and the focal point of the beam projected from the aperture are focused one on the other no matter which of the two is the light source. Consequently, when the beam projected through the aperture forms a focused scanning light spot on the object spotlighted, part of the light reflected from said light spot forms a reflected light spot identical with the beam projected at the point of the aperture.

On the other hand, when the beam projected from the aperture forms a scanning light spot not focused on the object spotlighted, the reflected light spot formed at the point of aperture by part of the reflected beam becomes less clear than the scanning light spot because the unfocused scanning light spot is not only larger than the focused scanning light spot but also the reflected light spot that appears on the point of aperture represents an enlarged scanning light spot arising from lack of focussing and further enlarged without achieving focus.

As is clear from the above, the reflected light spots formed at the point of aperture by part of the beam reflected from the scanning light spot all lack clarity unless they are formed through proper focussing of the scanning light spot.

The reflected light spot that appears at the point of aperture when the scanning light spot is formed by focussing is the magnified scanning light spot, for while the reflected light spot in this case forms a light spot identical with the light spot of the projected beam at the time of projection, the light spot used for scanning is that which has been obtained by focussing on a smaller area the light spot of the projected beam. Therefore, whether or not the scanning light spot has been obtained by proper focussing can adequately be determined visually by observing the reflected light spot at the monitoring aperture.

The light spot mechanism in the light spot focussing device of this invention is designed to provide the reflected light spot on the receiver screen. The light spot monitoring mechanism provides for reflecting part of the beam flux, which part is reflected from the scanning light spot, on the receiver screen. This is effected by positioning, in inclined relation, a transparent reflector in the path of the beam flux and which reflector does not obstruct the passage of the projected beam into the condenser lens.

As shown in FIG. 7, since the distance *e* between the receiver screen 19 and the transparent reflector plate and the distance *c* between the aperture and the transparent reflector plate are accurately equal, the light beam that appears on the receiver screen is formed by the reflection of the scanning light spot and is identical with the reflected light spot that appears at the aperture.

While in the embodiment the transparent reflector plate is represented as being mounted at an angle of 45 degrees, it is not always necessary to maintain the 45-degree angle in order to obtain the reflected light spot. It is possible to change the angle within the range in which the reflected beam of the reflected light spot is projected outside the projected beam flux. If the angle is varied, the position of the receiver screen inclines correspaonding to such a change.

It is evident from the foregoing that the light spot focussing device relative to this invention is capable of describing the state of scannig light spot, on the receiver screen, in such a manner as to make discrimination possible, thus permitting adjustment of the light spot focussing.

While the most appropriate embodiments of this invention have been explained in drawings, a wide range of variations are possible with respect to its construction. It should, therefore, be apparent that this invention is not limited to the embodiments given herein.

Furthermore, features of the three embodiments are interchangeable provided no contradiction develops in so doing.

What is claimed is:

1. A light spot focussing device for use in a facsimile transmitting equipment characterized by a light condenser unit including a light source, an aperture for projecting the beam from the light source and condenser lenses for focussing the projected beam on the object to be spotlighted as a scanning light spot; a transparent reflector plate mounted between the aperture and said lenses, and which does not obstruct the projected beam and is inclined in such a manner that the beam reflected from the scanning light spot is reflected outside said projected beam a receiver screen installed in the direction of the reflection from said transparent reflector plate at a position equal in distance to the distance between said transparent reflector plate and the aperture, for use as a light spot monitoring mechanism; and a mechanism operable to reciprocate said light condenser unit in the direction of beam projection.

2. A light spot focussing device for use in a facsimile transmitting equipment characterized by a light condensing unit including a light source, an aperture for projecting the beam from the light source and lenses for focussing the projected beam on the object to be spotlighted in the form of a scanning light spot; a light spot monitoring mechanism composed of a prism mounted between said aperture and said lenses and having an inclined plane so that the beam reflected from said scanning light spot can be reflected outside said projected beam, and a receiver screen mounted opposite said prism in the direction of the prism reflection at a position equal in optical distance to the optical distance between said prism and the aperture; and a movable base deck operable to reciprocate said light condensing unit and said light spot monitoring mechanism in the direction of light projection.

3. A light spot focussing device for use in a facsimile transmitting equipment characterized by a light condensing unit including a light source, an aperture for projecting the beam from the light source and condenser lenses for focussing the projected beam on the object to be spotlighted as a scanning light spot; a light spot monitoring mechanism composed of a transparent reflector plate, mounted between said aperture and said lenses, and inclined so that the beam reflected from the light spot can be reflected outside the projected light, and a receiver screen mounted in the direction of the reflection of said reflector plate at a position equal in distance to the distance between said transparent reflector plate and the aperture, a cylinder containing said lenses and fixed on a fixed base deck, and a plate, having an aperture, and said light spot monitoring mechanism fixed on a movable base deck reciprocable in the direction of light beam projection.

4. A light spot focussing device for use in a facsimile transmitting equipment characterized by a light condenser unit including a light source, an aperture for projecting the beam from the light source and condenser lenses for focussing the projected beam on the object to be spotlighted as a scanning light spot; a transparent reflector plate mounted between the aperture and said lenses, and which does not obstruct the projected beam and is inclined in such a manner that the beam reflected from the scanning light spot is reflected outside said projected beam; a receiver screen installed in the direction of the reflection from said transparent reflector plate at a position equal in distance to the distance between the transparent reflector plate and the aperture, for use as a light spot monitoring mechanism; and mechanism operable to reciprocate said lenses in the direction of beam projection.

References Cited

UNITED STATES PATENTS

| | | | |
|---|---|---|---|
| 2,701,501 | 2/1955 | Cuny | 88—1 |
| 2,759,393 | 8/1956 | McLeod | 88—1 |

ROBERT L. GRIFFIN, *Primary Examiner.*

J. A. ORSINO, *Assistant Examiner.*